United States Patent
Manivasagam et al.

(10) Patent No.: US 11,748,063 B2
(45) Date of Patent: Sep. 5, 2023

(54) INTELLIGENT USER CENTRIC DESIGN PLATFORM

(71) Applicant: Kyndryl, Inc., New York, NY (US)

(72) Inventors: Balasubramanian Manivasagam, Bengaluru (IN); Muniyandi Perumal Thevar, Madurai (IN); Sarita Lavania, Bengaluru (IN); Thangadurai Muthusamy, Bangalore (IN); Arumugam Sakthimurugan, Bangalore (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/565,802

(22) Filed: Dec. 30, 2021

(65) Prior Publication Data
US 2023/0214190 A1 Jul. 6, 2023

(51) Int. Cl.
*G06F 8/10* (2018.01)
*G06N 3/02* (2006.01)
(Continued)

(52) U.S. Cl.
CPC ............ *G06F 8/10* (2013.01); *G06F 8/22* (2013.01); *G06N 3/02* (2013.01); *G06N 7/01* (2023.01)

(58) Field of Classification Search
CPC .. G06F 8/10; G06F 10/22; G06N 7/01; G06N 3/02
(Continued)

(56) References Cited

U.S. PATENT DOCUMENTS

| 5,940,082 A | 8/1999 | Brinegar et al. |
| 7,197,740 B2 * | 3/2007 | Beringer ............... G06F 8/36 |
| | | 717/108 |

(Continued)

FOREIGN PATENT DOCUMENTS

WO 2021086368 5/2021

OTHER PUBLICATIONS

Shen et al, GraphicalAI: a User-Centric Approach to Develop Artificial Intelligence and Machine Learning Applications using a Visual and Graphical Language, ACM, pp. 52-58 (Year: 2021).*

(Continued)

*Primary Examiner* — Anil Khatri
(74) *Attorney, Agent, or Firm* — Erik Swanson; Andrew M. Calderon; Calderon Safran & Cole, P.C.

(57) ABSTRACT

An intelligent user centric design platform is provided. In implementations, a method includes: receiving, by a computing device, software design input from a user, the software design input including software domain information; sending, by the computing device, questions to the user selected from a database of predetermined questions based on the domain information; receiving, by the computing device, answers to the questions from the user, the answers including text information regarding design requirements of the user; determining, by the computing device, a proposed user-centric design (UCD) diagram by matching the answers to a stored UCD diagram in a repository using a supervised machine learning model; and presenting, by the computing device, the proposed UCD diagram in a user interface, wherein the user interface enables acceptance of the proposed UCD diagram or rejection of the proposed UCD diagram.

17 Claims, 10 Drawing Sheets

(51) Int. Cl.
*G06F 8/20* (2018.01)
*G06N 7/01* (2023.01)

(58) Field of Classification Search
USPC .............................. 717/102–120; 706/12–45
See application file for complete search history.

(56) References Cited

U.S. PATENT DOCUMENTS

| | | | | |
|---|---|---|---|---|
| 7,249,117 | B2 * | 7/2007 | Estes | G06N 5/022 |
| | | | | 706/18 |
| 7,756,806 | B1 | 7/2010 | Heidenreich et al. | |
| 7,761,493 | B1 * | 7/2010 | Markel | G06F 9/4492 |
| | | | | 707/765 |
| 7,813,822 | B1 * | 10/2010 | Hoffberg | H04N 7/163 |
| | | | | 381/73.1 |
| 8,027,944 | B1 | 9/2011 | Heidenreich et al. | |
| 8,032,470 | B1 | 10/2011 | Heidenreich et al. | |
| 8,090,608 | B2 * | 1/2012 | Schnack | G06Q 99/00 |
| | | | | 705/7.11 |
| 8,140,559 | B2 * | 3/2012 | Bobick | G06N 5/022 |
| | | | | 707/767 |
| 8,676,735 | B1 | 3/2014 | Heidenreich et al. | |
| 9,015,093 | B1 * | 4/2015 | Commons | G01C 21/3602 |
| | | | | 706/26 |
| 9,588,634 | B1 | 3/2017 | Edrey et al. | |
| 10,621,597 | B2 * | 4/2020 | Mascaro | G06N 20/00 |
| 10,827,329 | B1 * | 11/2020 | Dowlatkhah | H04W 8/005 |
| 11,570,253 | B1 * | 1/2023 | Bertz | H04L 63/10 |
| 11,625,648 | B2 * | 4/2023 | Polleri | G06F 16/285 |
| | | | | 706/12 |
| 11,636,355 | B2 * | 4/2023 | Li | G06F 40/289 |
| | | | | 704/9 |
| 11,640,516 | B2 * | 5/2023 | Baughman | G06F 18/211 |
| | | | | 706/25 |
| 2006/0004472 | A1 | 1/2006 | Eichstaedt et al. | |
| 2020/0372421 | A1 | 11/2020 | Vangala et al. | |

OTHER PUBLICATIONS

Dudley et al, "A Review of User Interface Design for Interactive Machine Learning", ACM, pp. 1-37 (Year: 2018).*
Anderson et al, "Integrating Usability Techniques into Software Development", IEEE, pp. 46-53 (Year: 2001).*
Edwards et al, "Stuck in the Middle: the Challenges of User-Centered Design and Evaluation for Infrastructure", ACM, pp. 297-304 (Year: 2003).*
Gabbard et al, "User-Centered Design and Evaluation of Virtual", IEEE, pp. 51-59 (Year: 1999).*
Engles et al, "Integrating Software Engineering and User-centred Design for Multimedia Software Developments", IEEE, pp. 254-256 (Year: 2003).*
Campos et al, "PractitionerTools and Workstyles for User-Interface Design", IEEE, pp. 73-80 (Year: 2007).*
Mell et al., "The NIST Definition of Cloud Computing", NIST, Special Publication 800-145, Sep. 2011, 7 pages.
Sumatosoft, "What Design Thinking Is and How It Is Used inSoftware Development", https://sumatosoft.medium.com/what-design-thinking-is-and-how-it-is-used-in-software-development-37cf8c581675, Mar. 4, 2019, 9 pages.
Anonymous, "Naive Bayes classifier", https://en.wikipedia.org/wiki/Naive_Bayes_classifier, accessed Nov. 2, 2021, 11 pages.
Anonymous, "ImageNet", https://en.wikipedia.org/wiki/ImageNet, accessed Nov. 2, 2021, 5 pages.
Anonymous, "Generative adversarial network", https://en.wikipedia.org/wiki/Generative_adversarial_network, accessed Nov. 2, 2021, 11 pages.

* cited by examiner

INTELLIGENT USER CENTRIC DESIGN PLATFORM

BACKGROUND

Aspects of the present invention relate generally to software design and, more particularly, to an intelligent user-centric design (UCD) platform.

In the field of software design, the process of Design Thinking enables software development companies to test the feasibility of a future product and its functionality at an early stage. In general, Design Thinking allows software designers to keep end user needs in mind, to clearly specify all requirements, and to translate the needs and requirements into product features. Design Thinking generally includes the steps: Empathize (e.g., gathering insights about users and trying to understand objectives, wishes and needs); Define: (e.g., identifying the challenge, such as difficulties faced by users, biggest user problem, what users actually need); Ideate (e.g., thinking about ways to solve the problems identified with the help of a software product to generate ideas); Prototype (e.g., create prototypes to test ideas); and Test (e.g., present the prototype to customers for feedback).

SUMMARY

In a first aspect of the invention, there is a computer-implemented method including: receiving, by a computing device, software design input from a user, the software design input including software domain information; sending, by the computing device, questions to the user selected from a database of predetermined questions based on the domain information; receiving, by the computing device, answers to the questions from the user, the answers including text information regarding design requirements of the user; determining, by the computing device, a proposed user-centric design (UCD) diagram by matching the answers to a stored UCD diagram in a repository using a supervised machine learning model; and presenting, by the computing device, the proposed UCD diagram in a user interface, wherein the user interface enables acceptance of the proposed UCD diagram or rejection of the proposed UCD diagram.

In another aspect of the invention, there is a computer program product including one or more computer readable storage media having program instructions collectively stored on the one or more computer readable storage media. The program instructions are executable to: receive software design input from a user, the software design input including software domain information; select questions from a database of predetermined questions based on the domain information and send the questions to the user; receive answers to the questions from the user, the answers including information regarding design requirements of the user; determine a proposed user-centric design (UCD) diagram by matching text information from the answers to a stored UCD diagram in a repository using a supervised machine learning model comprising a convoluted neural network trained by UCD diagrams in the repository and a text classifier model; and present the proposed UCD diagram in a user interface, wherein the user interface enables acceptance of the proposed UCD diagram, rejection of the proposed UCD diagram and modification of the UCD diagram.

In another aspect of the invention, there is system including a processor, a computer readable memory, one or more computer readable storage media, and program instructions collectively stored on the one or more computer readable storage media. The program instructions are executable to: receive software design input from a user, the software design input including software domain information; select questions from a database of predetermined questions based on the domain information and send the questions to the user; receive answers to the questions from the user, the answers including information regarding design requirements of the user; determine a proposed user-centric design (UCD) diagram by matching text information from the answers to a stored UCD diagram in a repository using a supervised machine learning model comprising a convoluted neural network trained by UCD diagrams in the repository and a text classifier model; and present the proposed UCD diagram in a user interface, wherein the user interface enables acceptance of the proposed UCD diagram, rejection of the proposed UCD diagram and modification of the UCD diagram.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
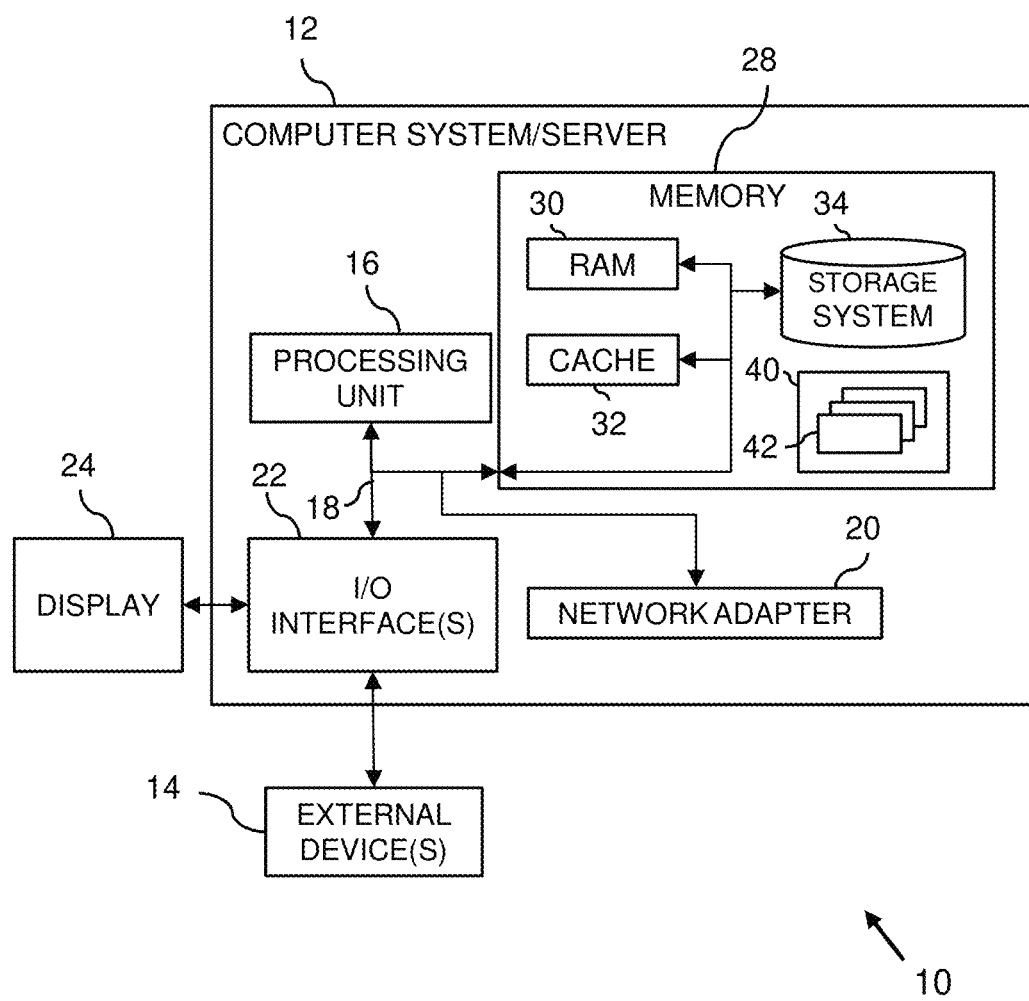
FIG. 1 depicts a cloud computing node according to an embodiment of the present invention.

Aspects of the present invention relate generally to software design and, more particularly, to an intelligent user-centric design (UCD) platform. According to aspects of the invention an artificial intelligence (AI) framework is used to train a software design system. In implementations, a knowledge base repository is pre-loaded with UCD diagrams for multiple domains (e.g., banking software, insurance software, etc.) based on historic software solutions (e.g., training data) delivered to one or more organizations. The term user-centric design (UCD) refers to an iterative software design process in which designers focus on the software users and their needs in each phase of the design process. The term UCD diagram as used herein refers to a software design for a user interface (UI) or screen that a user of the software will view and interact with. Such UCD diagrams may include images, text, design elements (e.g., tables, borders, colors, etc.), interactive icons, fillable fields, a layout of the UCD diagram, etc.

In implementations, a software designer is presented with questions (e.g., a questionnaire) including template questions for a domain (e.g., subject area) of the software being designed. A system extracts and analyzes text from the completed questionnaire, and creates a supervised machine learning model to empathize the users of the software being design (e.g., gather insights about users to understand objectives, wishes and needs of the users). In implementations, the supervised machine learning model is used to map questionnaire input with matching UCD diagrams (e.g., UI screen designs) against specific classification groups or domains. During an execution phase, a user is able to validate a suggested or proposed UCD diagram that provides solutions to software needs/requirements determined based on the questionnaire, and has the option to approve, modify or reject the suggested UCD diagram. When a UCD diagram is modified, the modified UCD diagram is stored with a training set in a repository for use in a future iteration of a software design process, thereby enabling the system to learn and improve accuracy over time. When a suggested UCD diagram is rejected, a user can supply a manually created UCD diagram (e.g., screen design), which is classified and stored in the repository, thereby further enabling the system to learn and improve accuracy over time.

In embodiments, a method includes: preloading a knowledge base repository with the UCD solution diagrams for every domain based on history of solutions delivered in an organization; presenting to a solutions designer, user centric template questions for a specific domain; extracting and analyzing a text template for creating a supervision machine model empathizing the user; utilizing the supervision machine model to map the UCD diagram present in the knowledge base; allowing the solution designer to modify or reject the proposed UCD diagram by reviewing it; and adding a modified UCD to the knowledge base for improving the system accuracy over a time period.

Based on the above, it can be understood that embodiments of the invention constitute improved software development systems that utilize AI models to automatically identify proposed UCD diagrams as solutions to software development problems/requirements. Implementations of the invention reduce software development timelines over manual Design Thinking processes utilizing an intelligent learning platform configured to learn and improve software problem and software solutions matching over time.

In general, software development personnel utilizing the Design Thinking process follow a manual iterative process wherein subject matter experts (SMEs) with deeper insight regarding a particular domain area participate in the software development. There are different software development phases that are followed to arrive at an optimal software solution (e.g., Empathize, Define, Ideate, Prototype, and Test). Each phase has certain steps to be followed, such as sharing participant inputs during an ideation phase, sharing their point of view on users of the software to be developed during an Empathy mapping phase, creating a scenario map, voting to determining a prioritizing grid, and identifying a "big idea" and story boarding and road-mapping based on the big idea. A high level of dependencies in the design process can prolong a software design period and add to overall costs and resources required during the design period. For example, dependencies include: the availability of all team members at the same time (e.g., high personnel dependencies); a high level of participation of the team members; and a SME or facilitator knowledgeable about the subject (domain) of the software area at issue to effectively conduct a design session and extract the best recommendations from all team members. Additionally, bias of team members must be taken into account (e.g., bias due to lack of information or clarity) during the development process. In consulting firms, for example, software designers work under stringent timelines. Due to the above listed dependencies, a routine Design Thinking session may take two weeks or more, with multiple iterations.

In general, the process of Design Thinking requires skilled resources to participate in the process, requires resources to be available, does not rely on analytics-driven data and does not take advantage of similar designs or outcomes (e.g., across different development groups of an organization). Implementations of the invention address these deficiencies using a supervised machine learning process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various user devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
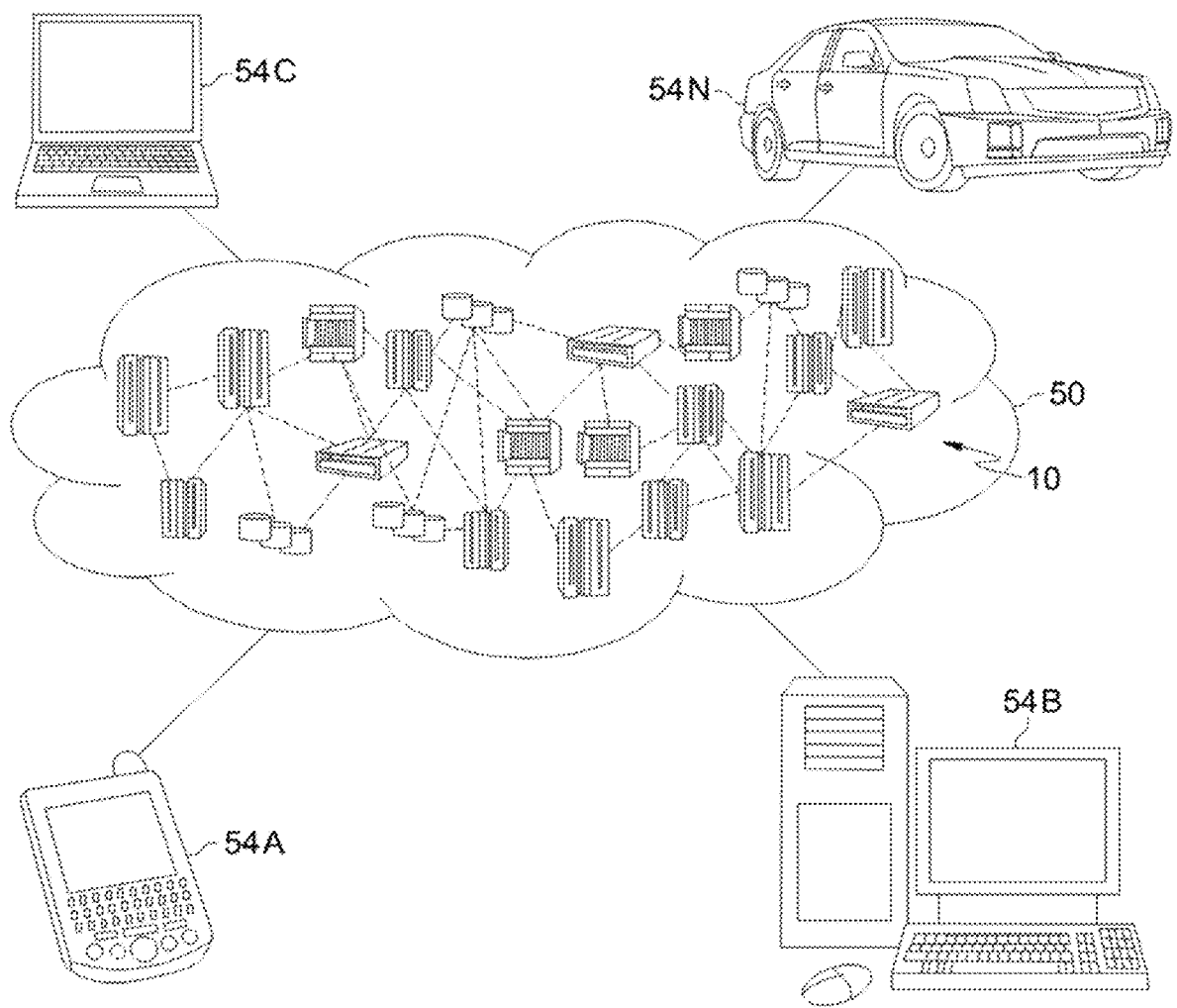
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
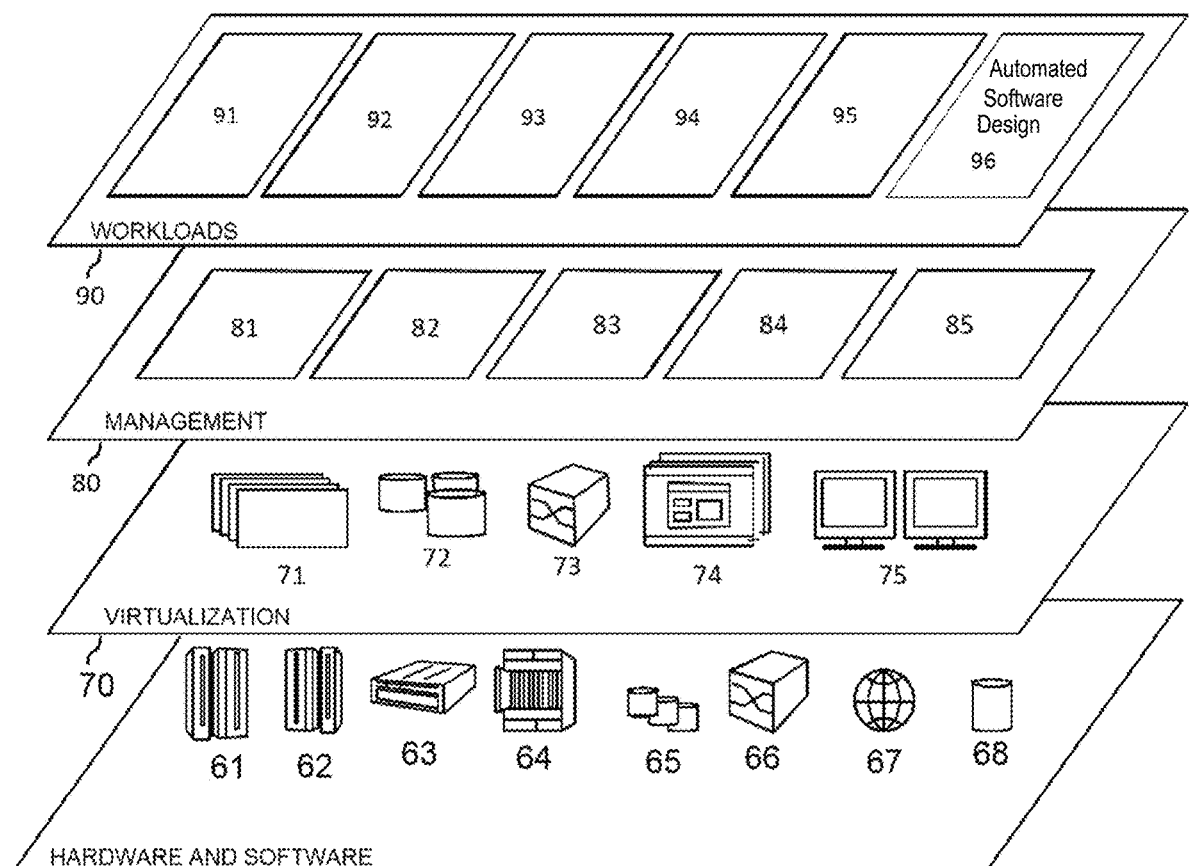
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated software design 96.

Implementations of the invention may include a computer system/server 12 of FIG. 1 in which one or more of the program modules 42 are configured to perform (or cause the computer system/server 12 to perform) one or more functions of the automated software design 96 of FIG. 3. For example, the one or more of the program modules 42 may be configured to: preload a knowledge base repository with UCD solution diagrams for every domain based on history of solutions (e.g., delivered in an organization); present to a solutions designer user-centric template questions for a specific domain; extract and analyze a text template for creating a supervised machine learning model empathizing the user; utilize the supervised machine learning model to map the UCD diagrams present in the knowledge base; enable the solution designer to modify or reject the proposed UCD diagram by reviewing it; and add a modified UCD to the knowledge base for improving the system accuracy over a time period.

Figure 4:
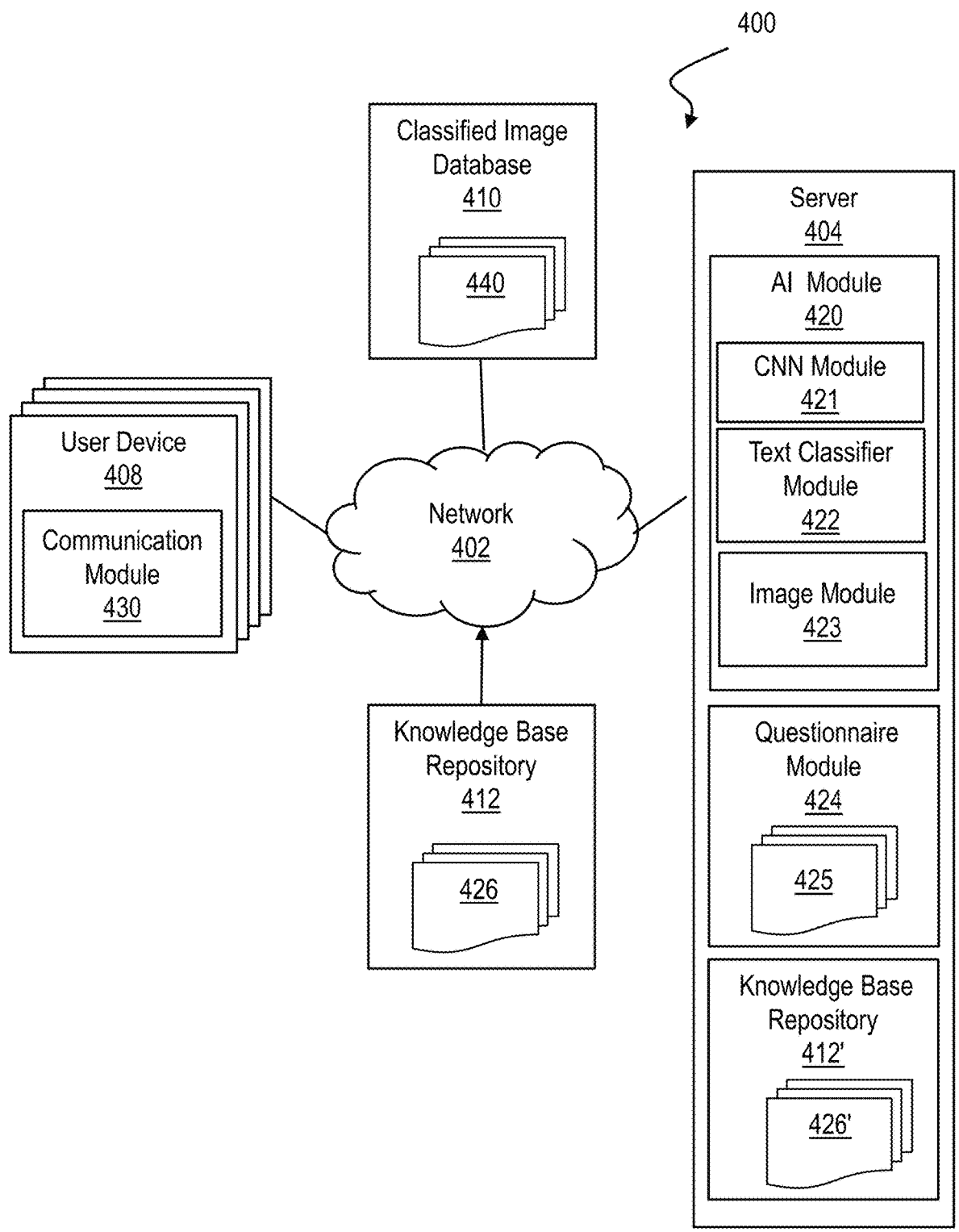
FIG. 4 shows a block diagram of an exemplary environment in accordance with aspects of the invention.

FIG. 4 shows a block diagram of an exemplary environment 400 in accordance with aspects of the invention. In embodiments, the environment 400 provides an intelligent User Centric Design (UCD) platform. In embodiments, the network 402 enables communication between a server 404, one or more user devices 408, a classification image database 410, and a knowledge base repository 412. Each of the server 404, one or more user devices 408, classified image database 410, and knowledge base repository 412 may comprise one or more computing systems (e.g., the computer system 12 of FIG. 1, or elements thereof). In embodiments, the knowledge base repository 412 is cloud-based repository accessible by users of the network 402. In implementations, the knowledge base repository is a knowledge base repository 412' local to the server 404. In other embodiments, the knowledge base repository 412 and the local knowledge base repository 412' are configured to share information over the network 402.

In implementations, the server 404 provides cloud services to users of the network 402, and comprises one or more computing nodes 10 in the cloud computing environment 50 of FIG. 2. In embodiments, the server 402 is a special purpose computing device configured to utilize machine learning to generate artificial intelligence (AI) models for use in methods of the invention. In implementations, each of the one or more user devices 408 comprises a local computing device used by cloud consumers in the cloud computing environment 50 of FIG. 2 (e.g., the personal digital assistant (PDA) or cellular telephone 54A, the desktop computer 54B, the laptop computer 54C).

With continued reference to FIG. 4, the server 402, the one or more user devices 408, the classification image database 410, and the knowledge base repository 412 may each include one or more program modules (e.g., program module 42 of FIG. 1) configured to perform one or more functions described herein. In the example of FIG. 4, the server 402 includes an artificial intelligence module 420 comprising a convoluted neural network (CNN) module 421, a text classifier module 422 and an image module 423. The server 402 further includes a questionnaire module 424 including a data store of questions 425. Each of the CNN module 421, text classifier module 422, image module 423 and questionnaire module 424 may comprise one or more program modules (e.g., program module 42 of FIG. 1).

In embodiments, the AI module 420 is configured to generate a supervised machine learning model to empathize the users of the software being designed (e.g., gather insights about users to understand objectives, wishes and needs of the users), wherein the supervised machine model may be utilized to map classifications to UCD diagrams 426 in the remote knowledge base repository 412, or to UCD diagrams 426' in the local knowledge base repository 412'.

In embodiments, the image module 423 is configured to perform image matching functions to match classified images with one or more software classification groups or domains. In implementations, the image module 423 utilizes a remote classified image database 410. In aspects, the image module 423 includes an image processing CNN configured to perform image segmentation, identification, and mapping. In embodiments, the image module 423 utilizes U-net, a CNN developed by the University of Freiburg for image segmentation.

In implementations the questionnaire module 424 is configured to generate select questions and generate questionnaires to be completed by users, wherein questions in the questionnaire are selected from the data store of questions 425 based on a domain or type of the software being designed (e.g., software in the banking domain, software in the insurance domain, etc.) and statements of the user (e.g., responses to the question and/or statements in an initial design query).

In implementations, the one or more user devices 408 each comprise a communication module 430 configured to enable communication between users of the one or more user devices 408 and the server 404. In implementations, the server 404 provides a user interface (UI) accessible by the one or more user devices 408 that enables users to select, reject and/or modify UCD diagrams selected/proposed by the AI module 420 according to methods of the invention.

In embodiments, the classified image database 410 includes a store of classified images 440. One example of a classified image database 410 that may be utilized in accordance with embodiments of the invention is ImageNet, a publicly accessible visual database organized according to the WordNet hierarchy. WordNet is a publicly accessible lexical database for the English language.

The server 404, one or more user devices 408, classified image database 410 and knowledge base repository 412 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
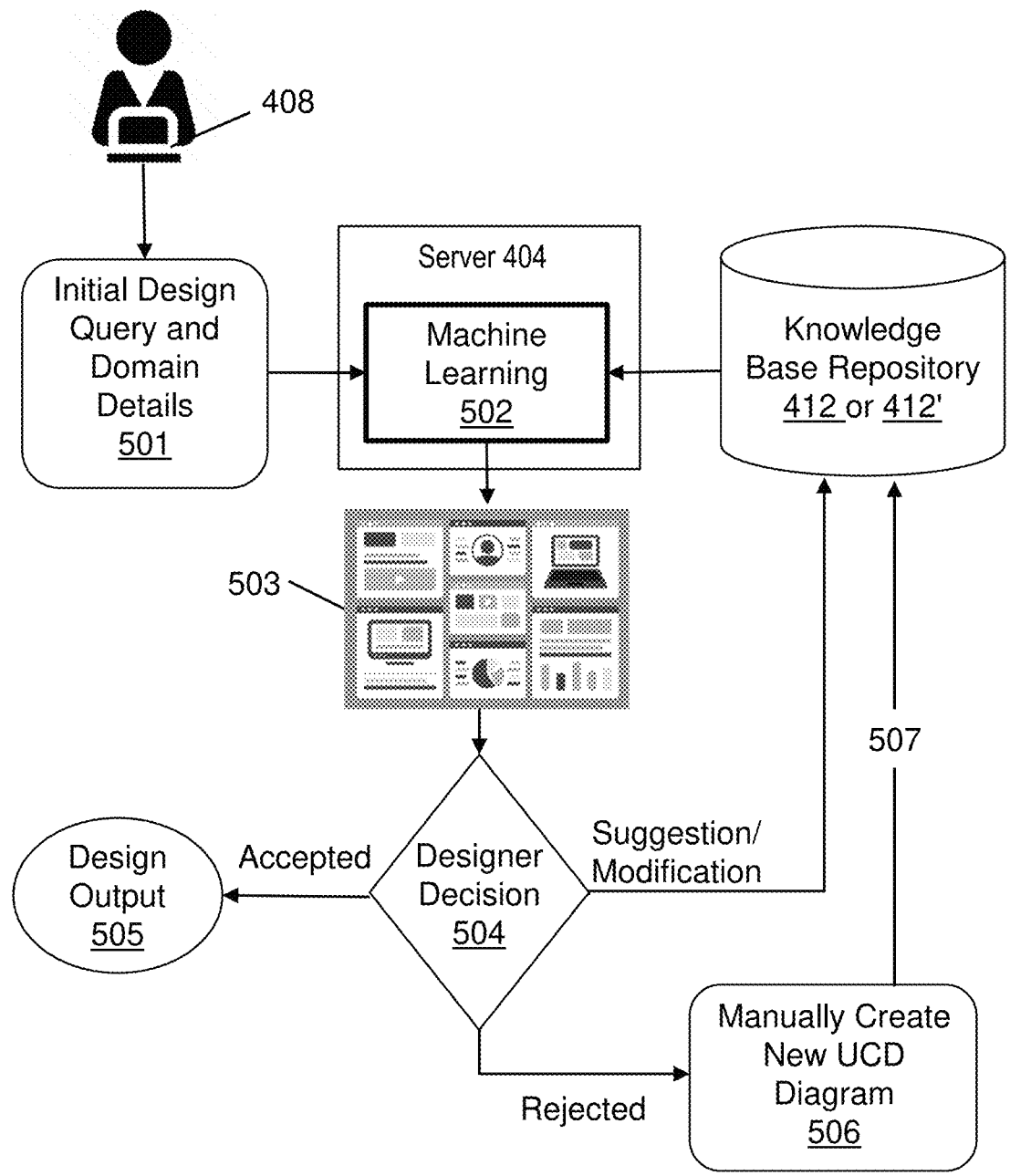
FIG. 5 is a diagram illustrating an overview of a software design process according to embodiments of the invention.

FIG. 5 is a diagram illustrating an overview of a software design process according to embodiments of the invention. Steps illustrated in FIG. 5 may be carried out in the environment of FIG. 4 and are described with reference to elements depicted in FIG. 4.

A software designer/user at a user device 408 sends an initial design query and domain information (details) to the server 404 at 501 for machine learning analysis at 502. The domain details may be collected by the server 404 through an iterative question and answer process with the designer/user. Based on the machine learning analysis at 502, the server 404 outputs a proposed UCD diagram 503 (e.g., software UI screen design) to a user for approval at 504. The user at 504 may be a SME, and may be the original designer/user at user device 408, or another user/team member at another user device. At 504, that user can select to accept, reject or modify the proposed UCD diagram 503. If the UCD diagram 503 is accepted at 504, the UCD diagram 503 can be output at 505 (e.g., by sending the finalized UCD diagram to the user device 408). In implementations, when the UCD diagram 503 is rejected at 504, the user is presented with options to manually create a new UCD diagram at 506. The new UCD diagram may be a completely new diagram, or may be a modified version of the proposed UCD diagram. In embodiments, the new UCD diagram is saved in the knowledge base repository 412 or 412', as indicated at 507. In implementations, in the case where the user determines that the proposed UCD diagram 503 should be modified at 504, the server 404 presents the user with options to modify the proposed UCD diagram 503, or options to associate suggested modifications with the proposed UCD diagram for later viewing/consumption by a software design team member.

Figure 6:
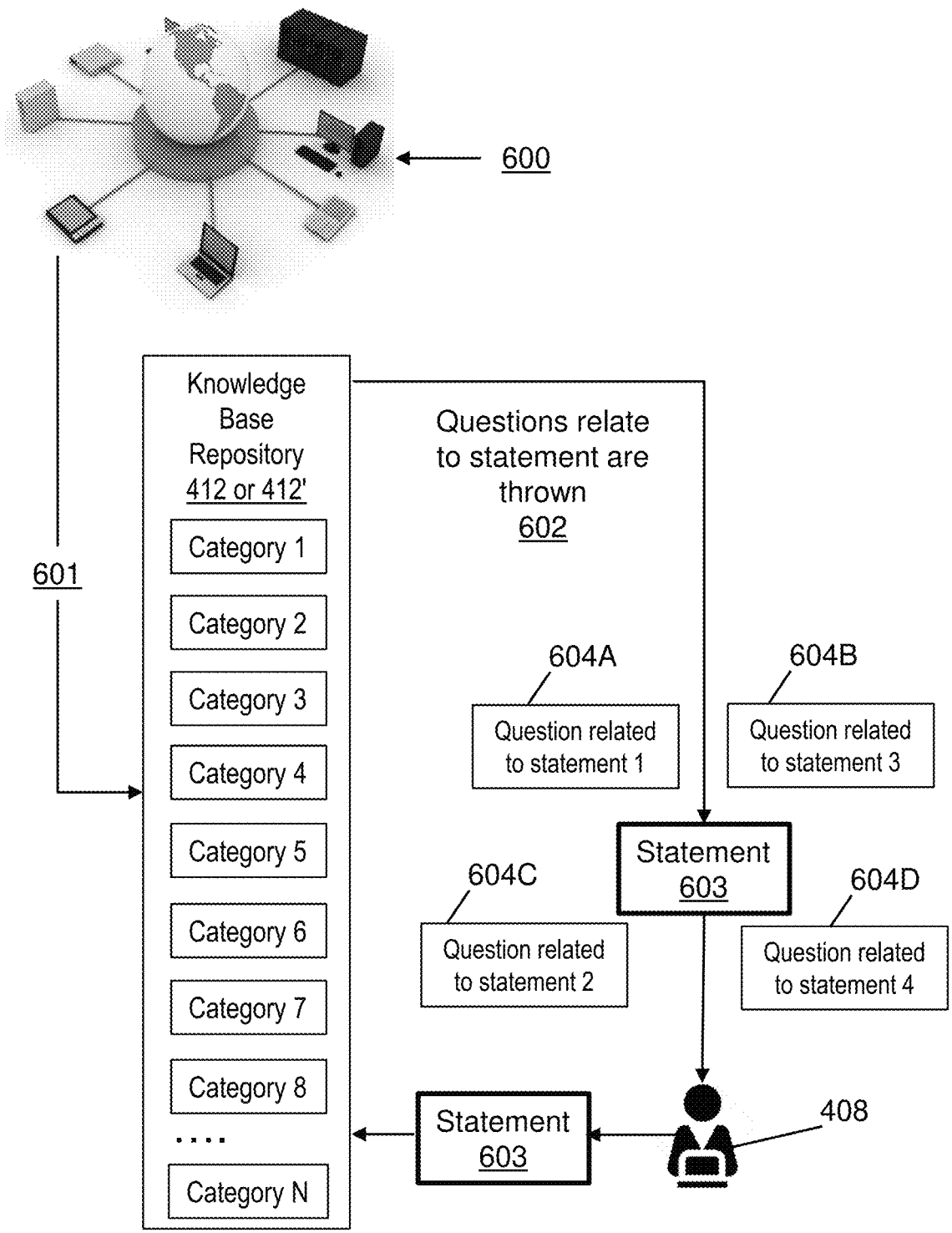
FIG. 6 is a diagram illustrating a relationship between user statements and a knowledge base repository according to embodiments of the invention

FIG. 6 is a diagram illustrating a relationship between user statements and a knowledge base repository according to embodiments of the invention. Steps illustrated in FIG. 6 may be carried out in the environment of FIG. 4 and are described with reference to elements depicted in FIG. 4.

In implementations, at 600 the server 404 collects data related to software design from various sources of data (accessible via the network 402, for example), categorizes the data (e.g., into categories 1-N), and stores the data in the knowledge base repository 412 or 412', as indicated at 601. The server 404 receives a statement 603 from the user (e.g., via the user device 408), and generates (throws) questions (e.g., questions 604A-604D) related to the statement 603 based on data in the knowledge base repository 412 or 412'. The server 404 then categorizes and saves the statement 603 in the knowledge base repository 412 or 412'. The user answers each question with a new statement, which the server 404 may categorize and save in the knowledge base repository 412 or 412'. In this way, the server 404 obtains information regarding the software to be designed, including domain information. The stored and categorized data for individual software design projects accumulates over time to build a knowledge base which the AI module 420 of the server 404 may utilize for automated machine learning tasks, as discussed in more detail below.

Figure 7:
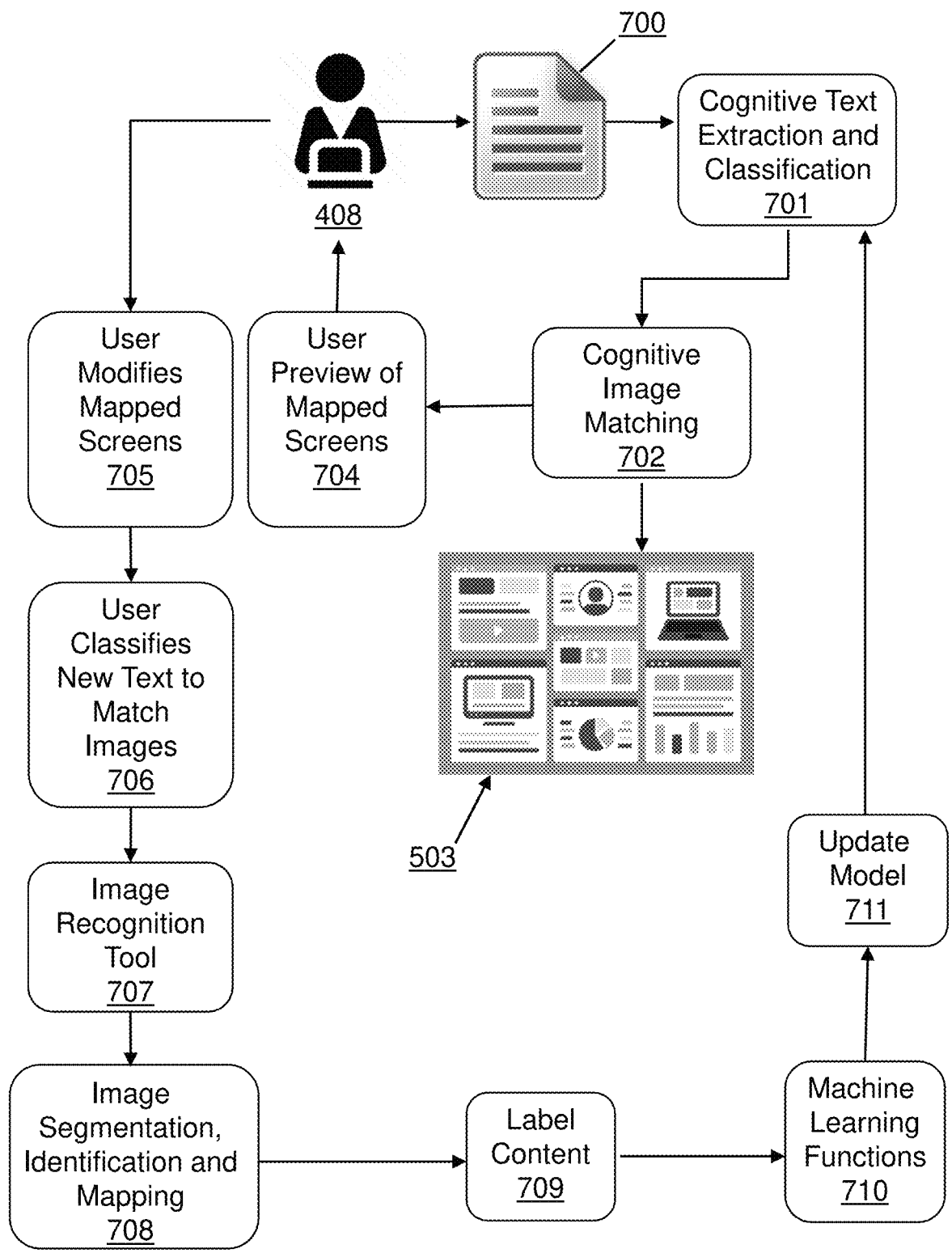
FIG. 7 is a diagram illustrating a continuous machine learning process according to embodiments of the invention.

FIG. 7 is a diagram illustrating a continuous machine learning process according to embodiments of the invention. Steps illustrated in FIG. 7 may be carried out in the environment of FIG. 4 and are described with reference to elements depicted in FIG. 4.

A software designer/user at a user device 408 provides answers 700 to questions provided by the server 404, the answers including domain information regarding a domain of the software being designed (e.g., banking software, insurance software, etc.). At 701, the server 404 (e.g., via CNN module 421) performs a cognitive text extraction to extract text of the answers 700, and classifies the extracted text (e.g., via text classifier module 422). In embodiments, the CNN module 421 of the server 404 comprises a CNN model trained to identify text that matches predefined software classification groups or domains. In implementations, the text classifier module 422 uses a classifier model (e.g., Naïve Bayes model) to classify the extracted text into organized software classification groups or domains.

With continued reference to FIG. 7, at 702 the server 404 performs cognitive image matching (e.g., via the image module 423) to match stored classified images (e.g., stored software screen designs) with the classified extracted text (e.g., using matching or semi-matching methods). In implementations, the server 404 outputs a proposed UCD diagram 503 (e.g., software UI screen design) based on the matching at 702.

In some cases, the server 404 may not find a matching UCD diagram 503. In this case, a user/designer may be provided with a plurality of software screen images or diagrams based on the matching at 702. At 704, the server 404 provides a preview of a number of software screen images that match (are mapped to) the classified extracted text to a user/designer at user device 408 (e.g., via a UI). The user/designer may manually modify (e.g., personalize) one or more of the software screen images. In implementations, the modification includes adding new text at 705. At 706, the user/designer classifies any new text added at 405 to match associated software screen images. The server 404 utilizes an image recognition tool 707 (e.g., image module 423) to analyze the one or more modified software screen images at 708. In embodiments, the image recognition tool 707 is configured to segment the one or more modified software screen images, identify individual elements of the one or more modified software screen images, and map the elements to predetermined software classification groups or domains. At 709 the server 404 labels the one or more modified software screen images with labels based on the software classification groups or domains, and stores the labeled content (e.g., in the knowledge base repository 412 or 412') for use in machine learning functions 710 of the server 404. In implementations, machine learning functions 710 utilize stored labeled content to update a supervised machine model utilized by the server 404 to extract and classify text at 711.

Figure 8:
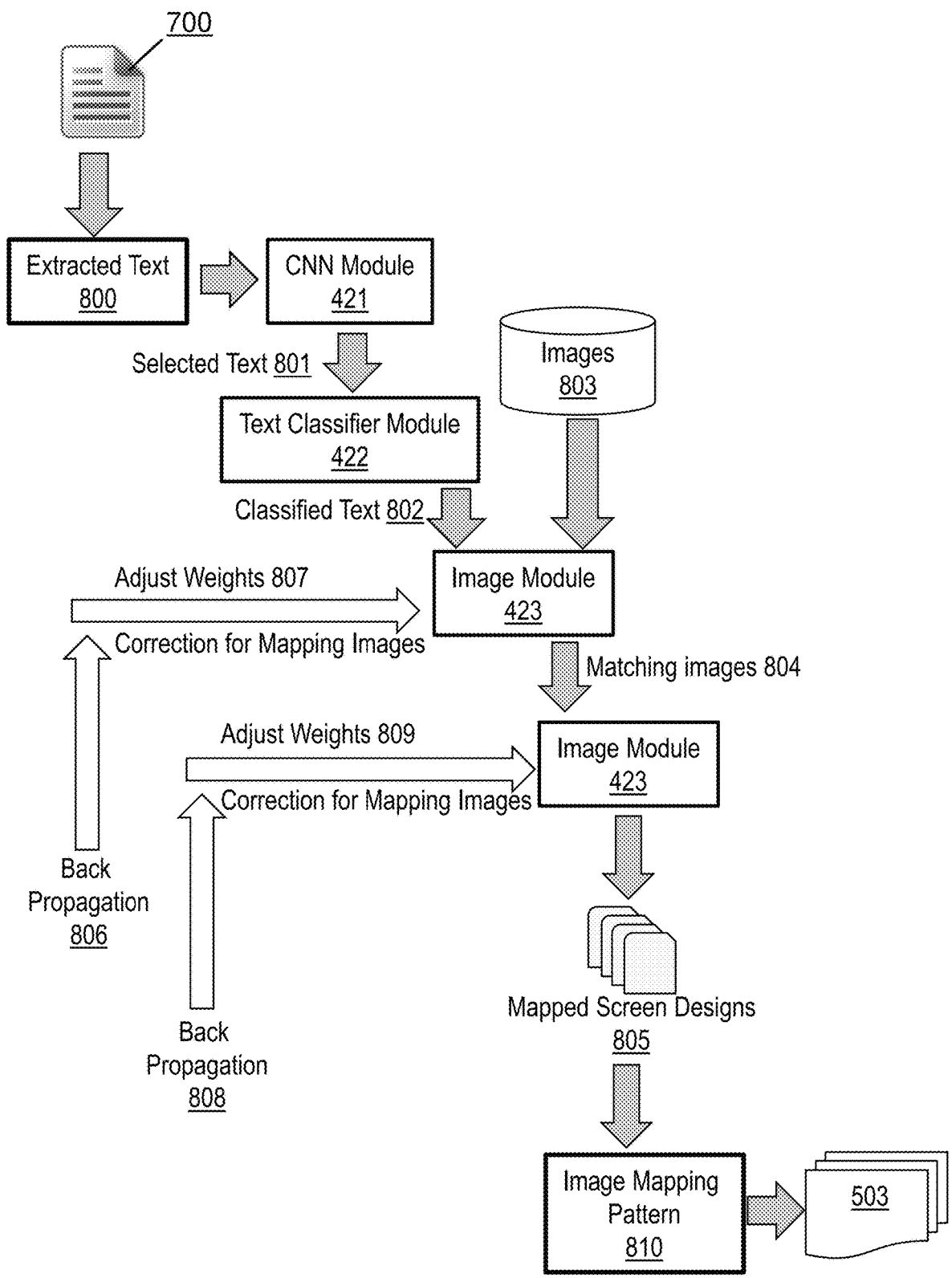
FIG. 8 is a diagram illustrating a supervised machine learning model utilized in accordance with embodiments of the invention.

FIG. 8 is a diagram illustrating a supervised machine learning model utilized in accordance with embodiments of the invention. Steps illustrated in FIG. 8 may be carried out in the environment of FIG. 4 and are described with reference to elements depicted in FIG. 4.

At step 800, text is extracted from a user's answers 700 to questions provided by the server 404. The extracted text is processed by a CNN model of the CNN Module 421 to obtain selected text 801 that is classified by a text classifier of the text classifier module 422. Classified text 802 is utilized by a machine learning model of the image module 423 to match on or more images from stored images 803 to the classified text. In implementations, the image module 423 utilizes the ImageNet image database to obtain matching images 804. The image module 423 processes the matching images 804 (e.g., with the U-net CNN) for image segmentation and pattern recognition, and generates mapped software screen designs 805 comprising images and text mapped to software classification groups or domains.

With continued reference to FIG. 8, in embodiments, the server 404 employs back propagation 806 to adjust weights 807 of the CNN model (to train the model). Similarly, in embodiments, the server 404 employs back propagation 808 to adjust weights 809 of the machine learning model (to train the model). The term back propagation or backpropagation refers to a machine learning algorithm used for training feedforward neural networks. In general, back propagation computes a gradient of a loss function with respect to weights of the network for a single input-output example.

In implementations, the server 404 can recognize (e.g., via the image module 423) image mapping patterns 810 based on the mapped screen designs 805, where the image mapping patterns 810 are patterns of software screen designs for a software classification group or domain. In implementations, the server 404 generates a final screen design output or proposed UCD diagrams 503 based on the recognized image patterns. In implementations, the server 404 recognizes images that match classifications, then use image recognition to determine if the images match images saved in UCD diagrams 503.

Figure 9:
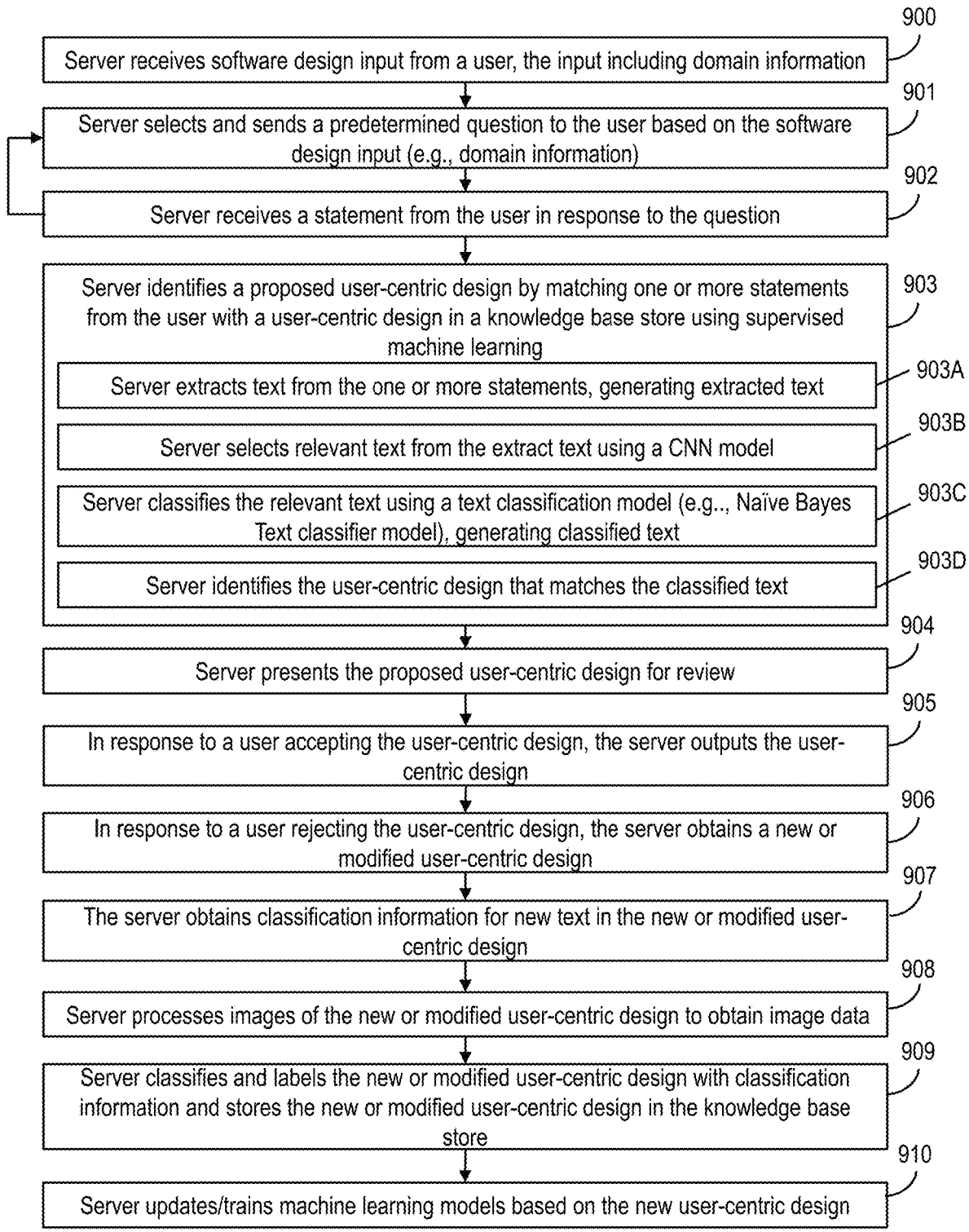
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIG. 4.

At step 900, the server 404 receives software design input from a user, the software design input including domain information. The term domain information refers to information regarding a software classification or software domain. In implementations, the software design input includes a design query comprising a request to obtain a proposed user-centric software design (e.g., a software interface screen design), and the domain information includes information regarding a purpose of the software (e.g., a banking interface, etc.). In embodiments, the questionnaire module 424 of the server 404 implements step 900.

At step 901, the server 404 selects and sends predetermined questions to the user from a database of classified predetermined questions based on the software design input from the user (e.g., text information in a design query and/or in text information in a user answer to a previously presented question). In implementations, the predetermined questions are classified and stored by software domain. In embodiments, the server 404 selects and sends one or more questions related to a domain for the software to be designed, wherein the server 404 determines the domain based on the domain information (e.g., using text recognition tools to match text in the domain information with stored text associated with or mapped to predetermined domains). In embodiments, the one or more questions can be in the form of one or more questionnaires sent to a client device 408 or presented to a user via a UI. In embodiments, the questionnaire module 424 of the server 404 implements step 901.

At step 902, the server 404 receives a statement (answer) from the user in response to the one or more questions. In embodiments, the questions and answer process of step 901 and 902 is repeated until the server 404 has enough software design information to determine if a match can be made at step 903. In implementations, the statements obtained from the user include information for determining user requirements or the needs of the user with respect to a software design. In embodiments, the questionnaire module 424 of the server 404 implements step 902.

At step 903, the server 404 determines a proposed UCD diagram (e.g., proposed UCD diagram 503) by matching one or more statements from the user with a UCD diagram in a knowledge base store using supervised machine learning. In implementations, a supervised machine learning model is used to map UCD diagrams in the knowledge base to classes (e.g., domains). In embodiments, the AI Module 420 of the server 404 implements step 903.

In general, supervised machine learning performs the task of learning a function that maps an input to an output based on example input-output pairs. In general, supervised machine learning infers a function from labeled training data consisting of a set of training examples. Each example is a pair consisting of an input object (e.g., a vector) and a desired output value or supervisory signal. A supervised learning algorithm or model analyzes training data and produces an inferred function, which can be used to map new examples. In embodiments, the supervised machine learning model is structured by combining a convoluted neural network (CNN) and a text classifier model. In implementations, the proposed UCD diagram is a user-interface screen for software comprising one or more images, text, and interactive elements (e.g., user-selected fields or options, fillable fields, etc.) arranged according to a formatting design, for performing one or more functions associated with a domain (e.g., insurance). In embodiments, step 903 is performed by substeps 903A-903D discussed below.

At substep 903A, the server 404 extracts text from the one or more statements (user answers), generating extracted text. Various text recognition tools and methods may be utilized to extract text from the one or more statements of the user, and embodiments of the invention are not intended to be limited to a particular text extraction tool or method.

At substep 903B, the server 404 selects relevant text (a subset of extracted text) from the extract text using a CNN model. In implementations, the CNN model is trained to identify text that matches predefined classification groups (e.g., domains).

At substep 903C, the server 404 classifies the relevant text using a text classification model, thereby generating classified text. In aspects, a Naïve Bayes text classifier model is used to classify the extracted text into organized classification groups or domains (TextClassifiers). In general, Naïve Bayes refers to a technique for constructing classifiers: models that assign class labels to problem instances, represented as vectors of feature values, where the class labels are drawn from some finite set. Naïve Bayes classifiers are a family of simple probabilistic classifiers based on applying Bayes' Theorem with strong independence assumptions between the features.

At substep 903D, the server 404 identifies the proposed UCD diagram based on matching the classified text to a stored UCD diagram in the knowledge base repository 412 or 412'. In embodiments, a database of visual objects (e.g., ImageNet) is used to combine the text classification and CNN classification for a final marking of an UCD diagram (e.g., output screen design) as matched versus semi-matched. In general, the term "ImageNet" or the "ImageNet Project" refers to an image database organized according to WordNet hierarchy in which each node of the hierarchy is depicted by hundreds and thousands of classified images, with annotations indicating what objects are pictured.

In implementations, the supervised machine learning model sequences the TextClassifiers, ImageNet and GenerativeNet for the purpose of solving the design problem indicated by the questionnaire. The term GenerativeNet refers to a generative adversarial network (GAN), which is a class of machine learning frameworks wherein two neural networks contest with each other (a zero-sum game). Given a training set, GAN frameworks learn to generate new data with the same statistics as the training set. For example, a GAN trained on photographs can generate new photographs that look at least superficially authentic to human observers.

At step 904, the server 404 presents the proposed UCD diagram for review by a user. In embodiments, server 404 determines a proposed UCD diagram for the particular domain associated with the software to be designed, and presents the proposed UCD diagram to a solution designer to be either accepted, modified, or rejected. In implementations, the server 404 presents the proposed UCD diagram to a user via a UI enabling a user to accept, reject, or modify the UCD diagram. In embodiments, the AI module 420 of the server 404 implements step 904.

At step 905, in response to a user accepting the UCD diagram, the server 404 outputs the UCD diagram. In embodiments, the server 404 sends the accepted UCD diagram to the user device 408 of a user in response to the design inquiry received at step 900. In embodiments, the AI module 420 of the server 404 implements step 905.

At step 906, in response to a user rejecting the UCD diagram, the server 404 obtains a new or modified UCD diagram from the user. In implementations, if the proposed UCD diagram is modified, the modified UCD diagram is added to the knowledge base repository 412 or 412', thereby adding to the training material for supervised machine learning and enabling the system to continuously learn and improve the accuracy of supervised machine learning models generated over a period of time. In implementations, the modified UCD diagram replaces the previously presented UCD diagram. In embodiments, the AI module 420 of the server 404 implements step 906.

In embodiments, the server 404 provides the user with software design tools to create a new UCD diagram or modify the proposed UCD diagram. In implementations, the server 404 receives a new or modified UCD diagram through a UI of the server 404. Various software design tools and methods may be utilized to create or modify a UCD diagram according to embodiments of the invention, and the present invention is not indented to be limited to any particular tools or methods. In aspects of the invention, the new or modified UCD diagram includes one or more images and associated text.

At step 907, the server 404 obtains classification information (software classification or domain information) for new text in the new or modified UCD diagram. In embodiments, a user provides the classification information. In implementations, the server 404 determines the classification information utilizing the CNN module 421 and text classifier module 422. In embodiments, the AI module 420 of the server 404 implements step 907.

At step 908, the server 404 processes images of the new or modified UCD diagram to obtain image data. In embodiments, the image module 423 classifies images using image recognition tools and methods. In embodiments, the AI module 420 of the server 404 implements step 908.

At step 909, the server 404 classifies and labels the new or modified UCD diagram with classification information and stores the new or modified UCD diagram in the knowledge base store. In embodiments, the server 404 classifies the images of the new or modified UCD diagram based on the image data and the text of the UCD diagram based on the classification information. In embodiments, the AI module 420 of the server 404 implements step 909.

At step 910, the server 404 updates/trains machine learning models based on the new UCD diagram. In embodiments, in cases where there are no matching UCD diagrams (solutions) present in the knowledge base, the server 404 generates an unsupervised machine learning model and compares it against a manually generated UCD diagram created by the solution designer to classify the manually generated UCD diagram. The server 404 then classifies and adds the classified manually generated UCD diagram to the knowledge base repository 412 or 412' for use in future iterations of the software design process. In embodiments, the AI module 420 of the server 404 implements step 910.

Figure 10:
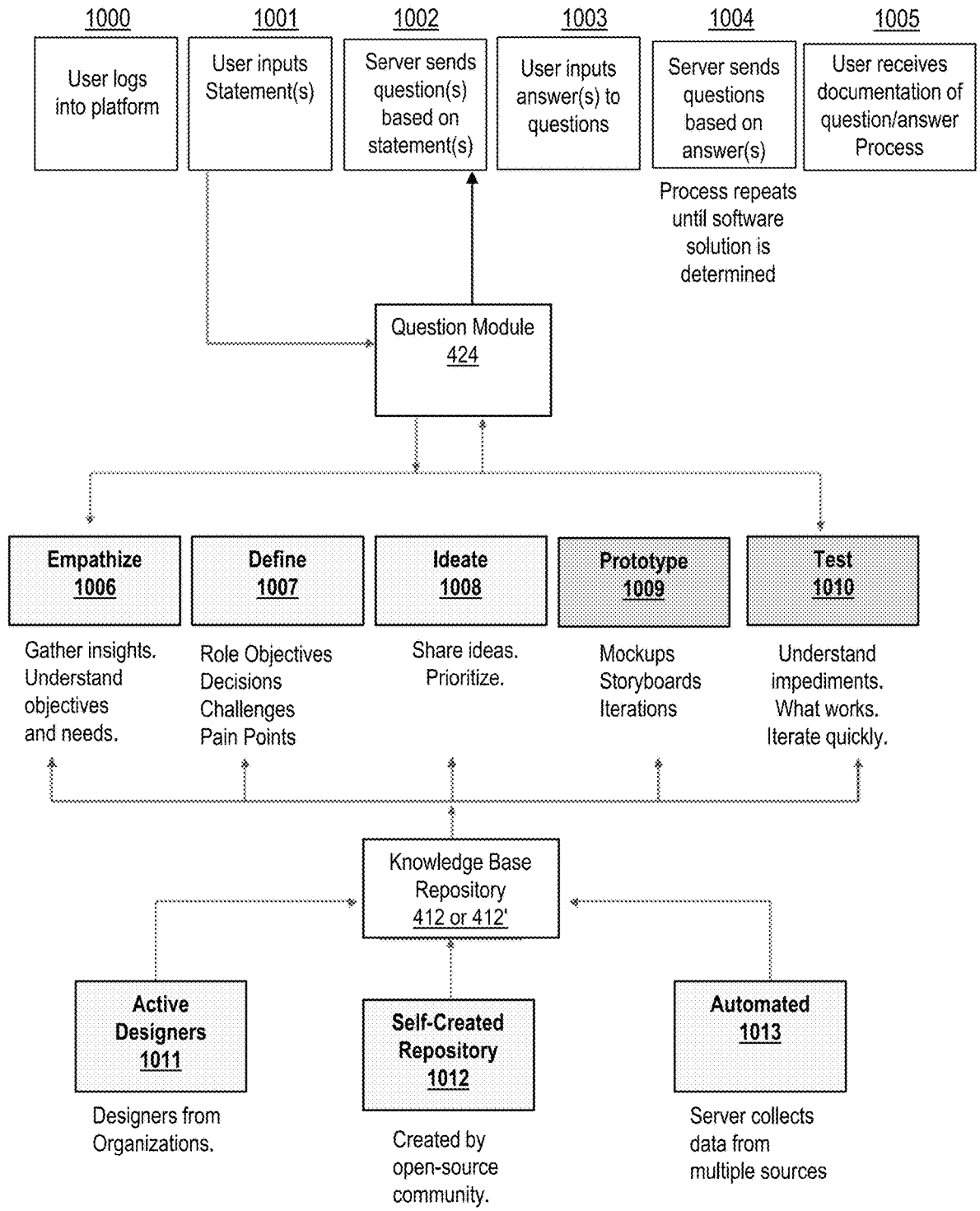
FIG. 10 is a diagram of an automated design thinking workflow in accordance with embodiments of the invention.

FIG. 10 is a diagram of an automated design thinking workflow in accordance with embodiments of the invention. Steps illustrated in FIG. 10 may be carried out in the environment of FIG. 4 and are described with reference to elements depicted in FIG. 4.

FIG. 10 illustrates a process of Design Thinking that incorporates AI processes in accordance with embodiments of the invention. At 1000, a user (via a client device 408) logs into the intelligent UCD platform comprising the server 404 of FIG. 4 (e.g., via a UI). The user inputs one or more statements at 1001 regarding software to be designed. The statements may be in the form of an initial design query and domain details 501 of FIG. 5. At 1002, the question module 424 of the server 404 sends the user one or more questions (e.g., from a question store 425) based on the one or more statements. At 1003, the user inputs one or more answers to the questions into the intelligent UCD platform (e.g., via a UI). At 1004, the server 404 sends one or more questions based on the one or more answers, and steps 1001-1004 repeats until a software solution can be determined by the server 404. In implementations, the user can obtain documentation of the question/answer process of steps 1001-1004 from the server 404.

In implementations, steps of the Design Thinking process 1006-1010 are completed, wherein the steps of empathizing, defining and ideating (steps 1006-1008) are completed with assistance from the AI module 420 of the server 404, utilizing information stored in the knowledge base repository 412 or 412'. Information stored in the knowledge base repository 412 or 412' may be obtained from active designers 1011 (e.g., designers from various organizations), self-created repositories (e.g., from the open-source community), and from various data sources accessible via the network 402, which can be automatically collected and stored by the server 404.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, software design query from a user requesting an interface screen design for software to be designed, the software design query including software domain information indicating a purpose of the software to be designed;
selecting, by the computing device, questions from a database of classified predetermined questions based on the software domain information;
sending, by the computing device, the questions to the user;
receiving, by the computing device, answers to the questions from the user, the answers including text information regarding software design requirements of the user;
determining, by a supervised machine learning model of the computing device, a proposed user-centric design (UCD) diagram by matching the answers to a stored UCD diagram in a repository, wherein the proposed UCD diagram is a software design for a user interface (UI), including interactive elements;
presenting, by the computing device, the proposed UCD diagram in a user interface, wherein the user interface enables acceptance of the proposed UCD diagram or rejection of the proposed UCD diagram;
receiving, by the computing device acceptance of the proposed UCD diagram or rejection of the proposed UCD diagram;
receiving, by the computing device, a modified version of the proposed UCD diagram;
storing, by the computing device, the modified version of the proposed UCD diagram in the repository; and
updating, by the computing device, the supervised machine learning model based on the modified version of the UCD diagram in the repository.

2. The method of claim 1, wherein the proposed UCD diagram includes formatting for at least one selected from the group consisting of: image elements, text elements, and functional elements of a software screen design.

3. The method of claim 1, wherein the supervised machine learning model comprises a convoluted neural network trained by UCD diagrams in the repository and a text classifier model.

4. The method of claim 1, wherein the determining the proposed UCD diagram comprises:
extracting, by the computing device, text from the answers to the questions;
selecting, by the computing device, a subset of the extracted text utilizing a convoluted neural network;

classifying, by the computing device, the subset of text into predefined classifications using the text classifier model; and identifying, by the computing device, images from a data store that match the subset of text based on the predefined classifications, wherein the determining the proposed UCD diagram comprises matching the images and the subset of text to a stored UCD diagram in a repository.

5. The method of claim 4, wherein the text classifier model is a Naïve Bayes model.

6. The method of claim 1, wherein the computing device includes software provided as a service in a cloud environment.

7. A computer program product comprising one or more computer readable storage media having program instructions collectively stored on the one or more computer readable storage media, the program instructions executable to:

receive software design input from a user, the software design input including software domain information;

select questions from a database of predetermined questions based on the domain information and send the questions to the user;

receive answers to the questions from the user, the answers including information regarding design requirements of the user;

determine a proposed user-centric design (UCD) diagram by matching text information from the answers to a stored UCD diagram in a repository comprising a convoluted neural network trained by UCD diagrams in the repository and a text classifier model; and present the proposed UCD diagram in a user interface, wherein the user interface enables acceptance of the proposed UCD diagram, rejection of the UCD diagram and modification of the proposed UCD diagram, wherein the program instructions are further executable to:

receive a modified version of the proposed UCD diagram; store the modified version of the proposed UCD diagram in the repository; and update a supervised machine learning model based on the modified version of the proposed UCD diagram in the repository.

8. The computer program product of claim 7, wherein the proposed UCD diagram includes formatting for at least one selected from the group consisting of: image elements, text elements, and functional elements of a software screen design.

9. The computer program product of claim 7, wherein the program instructions are further executable to:

receive a new UCD diagram;

store the new UCD diagram in the repository; and update the supervised machine learning model based on the new UCD diagram in the repository.

10. The computer program product of claim 7, wherein the determining the proposed UCD diagram comprises:

extracting text from the answers to the questions;

selecting a subset of the extracted text utilizing a convoluted neural network;

classify the subset of text into predefined classifications using the text classifier model; and identifying images from a data store that match the subset of text based on the predefined classifications, wherein the determining the proposed UCD diagram comprises matching the images and the subset of text to a stored UCD diagram in a repository.

11. The computer program product of claim 10, wherein the text classifier model is a Naïve Bayes model.

12. A system comprising:

a processor, a computer readable memory, one or more computer readable storage media, and program instructions collectively stored on the one or more computer readable storage media, the program instructions executable to:

receive software design input from a user, the software design input including software domain information;

select questions from a database of predetermined questions based on the domain information and send the questions to the user;

receive answers to the questions from the user, the answers including information regarding design requirements of the user;

determine a proposed user-centric design (UCD) diagram by matching text information from the answers to a stored UCD diagram in a repository using a supervised machine learning model comprising a convoluted neural network trained by UCD diagrams in the repository and a text classifier model; and present the proposed UCD diagram in a user interface, wherein the user interface enables acceptance of the proposed UCD diagram, rejection of the proposed UCD diagram and modification of the UCD diagram, wherein the program instructions are further executable to:

receive a modified version of the proposed UCD diagram;

store the modified version of the proposed UCD diagram in the repository; and update the supervised machine learning model based on the modified version of the proposed UCD diagram in the repository.

13. The system of claim 12, wherein the proposed UCD diagram includes formatting for at least one selected from the group consisting of: image elements, text elements, and functional elements of a software screen design.

14. The system of claim 12, wherein the program instructions are further executable to:

receive a new UCD diagram;

store the new UCD diagram in the repository; and update the supervised machine learning model based on the new UCD diagram in the repository.

15. The system of claim 12, wherein the determining the proposed UCD diagram comprises:

extracting text from the answers to the questions;

selecting a subset of the extracted text utilizing a convoluted neural network;

classify the subset of text into predefined classifications using the text classifier model; and identifying images from a data store that match the subset of text based on the predefined classifications, wherein the determining the proposed UCD diagram comprises matching the images and the subset of text to a stored UCD diagram in a repository.

16. The system of claim 12, wherein the text classifier model is a Naïve Bayes model.

17. The system of claim 12, wherein the program instructions are further executable to employ back propagation to adjust weights of parameters in the convoluted neural network and the text classifier model to update the convoluted neural network and the text classifier model.

* * * * *